United States Patent [19]

Horning et al.

[11] Patent Number: 5,432,582
[45] Date of Patent: Jul. 11, 1995

[54] RATCHETING, COMPLIANT MAGAZINE DRIVE COUPLING

[75] Inventors: Randy E. Horning, LeRoy; Richard J. Backus, Rochester; Ronald W. Grant, Jr., Caledonia, all of N.Y.

[73] Assignee: Eastman Kodak Company, Rochester, N.Y.

[21] Appl. No.: 195,237

[22] Filed: Feb. 14, 1994

[51] Int. Cl.⁶ .................. G03D 3/08; G03D 13/08
[52] U.S. Cl. .................. 354/319; 354/340; 354/341; 192/46; 242/348; 242/349
[58] Field of Search .................. 354/319–323, 354/339, 340, 341; 192/46, 12, 38; 242/71, 71.1, 71.2, 71.5; 464/38

[56] References Cited

U.S. PATENT DOCUMENTS

| | | |
|---|---|---|
| 388,829 | 5/1888 | Rowlett . |
| 423,266 | 3/1890 | McGuire .................. 192/46 |
| 510,886 | 12/1893 | Broome . |
| 661,908 | 11/1900 | Everich .................. 192/46 |
| 1,126,219 | 1/1915 | Hupp .................. 464/38 |
| 1,281,507 | 10/1916 | Burks .................. 464/38 |
| 1,574,462 | 6/1926 | Wintroath .................. 192/46 |
| 1,850,197 | 3/1932 | Bodenhorn . |
| 3,433,337 | 8/1969 | Salter . |
| 3,543,896 | 12/1970 | Mooney .................. 192/46 |
| 3,572,481 | 3/1971 | Moritz .................. 192/12 |
| 3,865,220 | 2/1975 | Thompson .................. 192/46 |
| 4,012,755 | 3/1977 | Arai .................. 354/214 |
| 4,274,728 | 6/1981 | Waaske .................. 354/275 |
| 5,212,512 | 5/1993 | Shiota .................. 354/319 |

FOREIGN PATENT DOCUMENTS

| | | | |
|---|---|---|---|
| 3927 | 10/1887 | Germany .................. 192/46 |
| 1610 | of 1875 | United Kingdom .................. 192/46 |

Primary Examiner—D. Ruthledge
Attorney, Agent, or Firm—Frank Pincelli

[57] ABSTRACT

An apparatus for coupling which includes first and second shafts, each having an axis. The axes are disposed in generally coaxial relationship. The apparatus includes coupling having first and second members for coupling the first shaft to the second shaft to allow transmission of rotational movement from one of said shafts to the other of said shafts upon rotation of the one shaft. The first and second members have a configuration which allows transmission of rotational movement from one shaft to the other shaft in a first direction of rotational movement and not allowing transmission of rotational movement from one shaft to another shaft in a second direction of rotational movement. The first member is mounted on the first shaft so as to allow movement on the first shaft in a direction that is perpendicular to the axis of the first shaft.

14 Claims, 5 Drawing Sheets

RATCHETING, COMPLIANT MAGAZINE DRIVE COUPLING

FIELD OF THE INVENTION

The invention relates generally to the field of torque transmitting apparatus for transmitting rotational forces and particularly to a one way coupling assembly for use in a photofinishing apparatus for allowing transfer of rotational movement from one shaft to another shaft that is not precisely aligned.

BACKGROUND OF THE INVENTION

In certain photofinishing equipment there is provided a removable magazine upon which finished photosensitive material is placed. The magazine is designed to interface with the photofinishing equipment so that a light tight seal is formed therebetween. In such devices it is paramount that this light tight seal be maintained. In order to achieve this seal there is often provided a complex geometric interface between the magazine and the equipment. This requires that the removable magazine be positioned at a specific location. It is also necessary to align a drive mechanism with the magazine core so that rotary motion may be properly transferred to the core. Frequently a conflict occurs between the magazine positioning requirements of the light lock and the requirements to align the axis of the drive shaft to the magazine core. Since the light lock requirement is paramount, a coupling is provided for allowing proper engagement.

One prior art coupling utilizes two pins extending axially from a hub. The pins are parallel and are disposed at equal distances from the rotational axis of the hub. Cooperating with the pins is a bar mounted on an axially adjacent hub mounted so as to extend intermediate the two pins so that rotational movement from one hub will drive the other hub rotationally. Such constructions have several disadvantages.

DISADVANTAGES OF THE PRIOR ART

These include relatively complex assembly. More particularly, a problem with the bar and pin arrangement is that one must engage the coupling by inserting the bar between the pins (and/or the pins around the bar) in a generally axial direction. Thus, the bar may strike the axial extremity of one of the pins and thus fail to nest or seat properly between the two pins. This means that the bar must be inserted essentially intermediate the pins. Furthermore, the relationship of the light lock features to the hub often requires that the coupling engage and disengage in a direction perpendicular to the hub axes. This is impossible with the bar and pin arrangement. Complex arrangements using sensors may be provided to assure proper meshing of the pins and the bar. It will thus be seen that the pin and bar arrangement typically make engagement and disengagement very difficult. Because the normal operation of a machine may require separation of the apparatus as an incident of normal operational procedures, the difficulty of assembly is not merely a one time occurrence.

Another problem with this prior art construction is that there is a potential hazard to a user of the apparatus in that inadvertent placement of fingers in the area of the pins and the bar may easily result in injury if the motor used to operate the apparatus is inadvertently turned on. A difficulty with the pin arrangement is particularly acute if the bar is removed from engagement with the pins and someone were to insert their fingers in the area of the pins when the motor was energized.

Still another difficulty of this prior structure is that it does not readily lend itself to manual disconnection of the coupling in order to cinch the media or paper web on the reel on which it is mounted. Stated another way, the paper must be cinched on the core/spindle of the magazine in the normal operation of the apparatus. This is not easily possible in the prior art structure.

One way clutch apparatus such as ratchets have been used in combination with various mechanisms to permit cinching of paper on the spindle of a magazine. Typically, such apparatus do not tolerate misalignment of the drive and driven shafts and thus are not completely satisfactory because manufacturing tolerances and wear over the operation life of the apparatus may result in some misalignment.

SUMMARY OF THE INVENTION

The present invention overcomes the disadvantages of the prior art by providing a construction that allows for easy engagement and disengagement with apparatus such as paper core drives and which does not pose a risk for the operators of the apparatus. In addition, the apparatus in accordance with the invention permits transmission of rotational forces even if there is some misalignment of the drive and driven shafts.

ADVANTAGEOUS EFFECTS OF THE INVENTION

This invention provides a safe means for transferring rotary motion while providing easy engagement and disengagement of the apparatus of the invention. The foregoing is accomplished by providing a coupling assembly for coupling first and second shafts. The coupling assembly includes a first member secured to the end of the first shaft having a first engaging surface, and a second member secured to the end of the second shaft a second engaging surface. The first and second engaging surfaces are disposed in generally abutting relationship. A biasing means is provided for biasing the first and second engaging surfaces into making contact. The first and second engaging surfaces having a configuration which allows transmission of rotational movement from the first shaft to the second shaft in a first directional rotational movement and not allowing transmission of rotational movement from the first shaft to the second shaft in a second direction of rotational movement. The first member may be secured to the first shaft by mounting means which allows movement of the first member in the direction that is substantially perpendicular to the axis of rotation of the first shaft.

DESCRIPTION OF THE PREFERRED EMBODIMENTS

Figure 4:
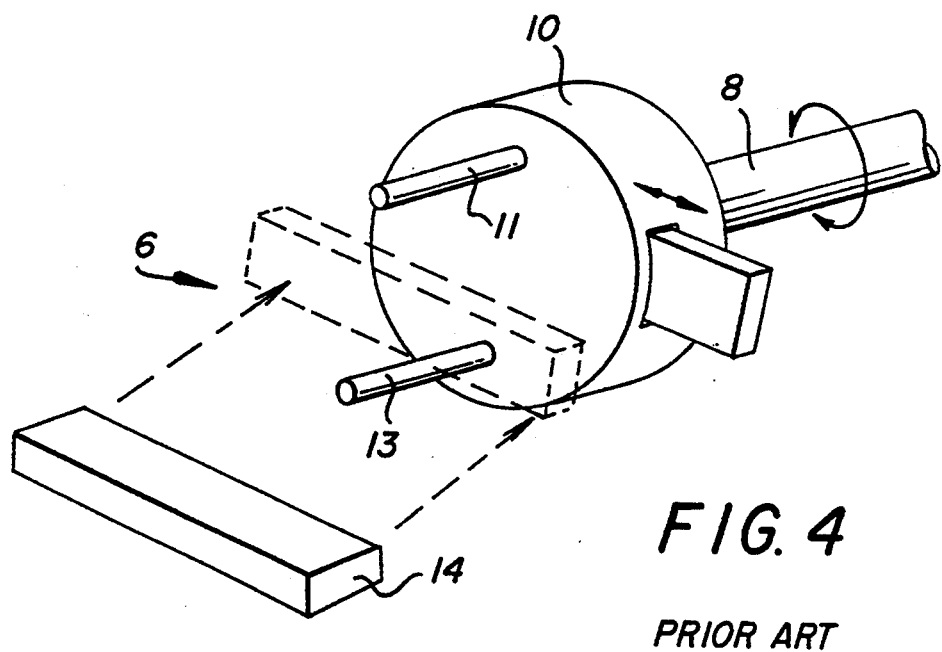
FIG. 4 is a partially schematic view illustrating a prior art structure.
Figure 5:
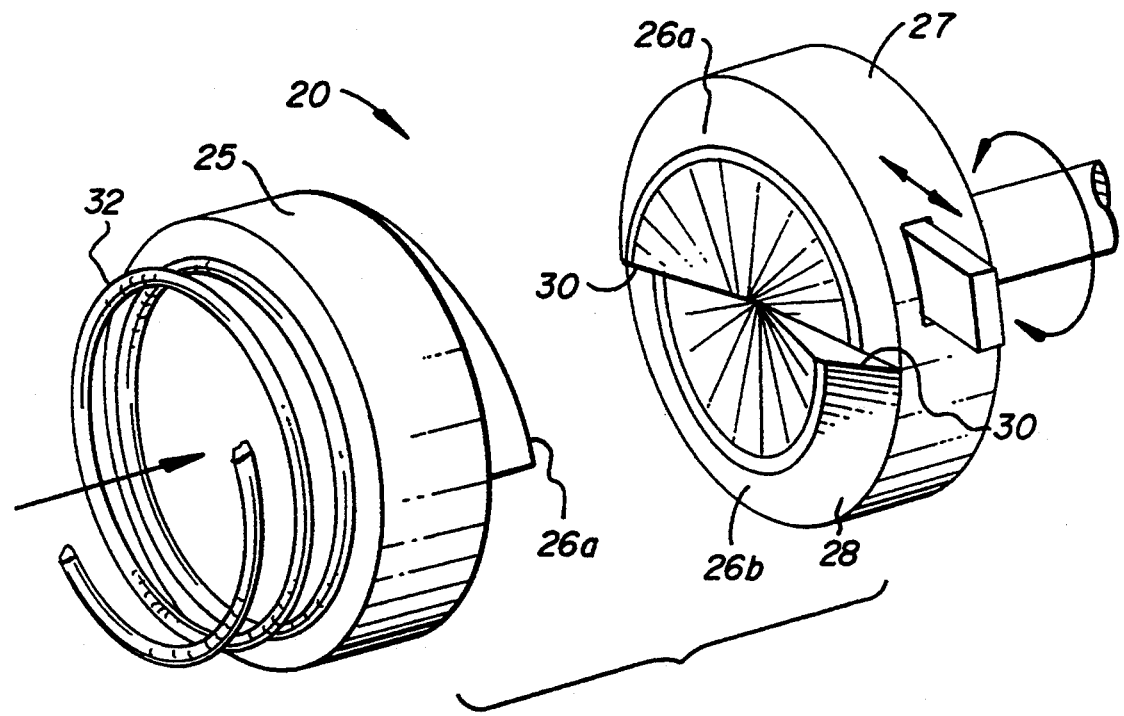
FIG. 5 is a partial perspective view of the of the coupling of FIG. 2 illustrating one of the mating axial faces; of the coupling shown in FIG. 2.

Referring first to FIG. 4, there is shown a prior art structure in which a drive shaft 8 is provided with a head 10 having axially extending pins 11, 13 extending therefrom. A cooperating head (not shown) has a bar 14 which is engaged or positioned intermediate the pins 11, 13 so that upon rotation of the shaft 8 the bar 14 will rotate. It will be understood that the bar 14 is fixed to a driven shaft (not shown) and thus the necessary coupling is achieved. A disadvantage of this structure is that there is a danger of an operator of the machine placing his fingers intermediate the pins 11, 13 when the shaft 8 is being turned and thus sustaining a serious injury. A further disadvantage of this structure is that it is relatively difficult to engage the respective members. This is of significance because it is inherent in the application for a printer as well as many other applications that the connection must be made repetitively.

Figure 9:
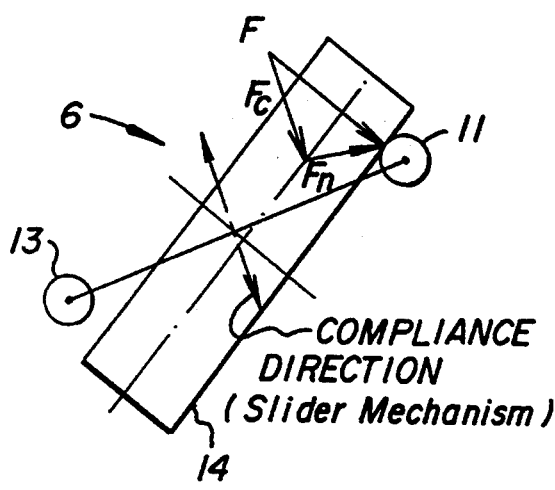
FIG. 9 is a diagrammatic view illustrating the forces in the prior art mechanism.

Referring now to FIG. 9 there is shown a diagrammatic view of the prior art mechanism shown in FIG. 4 which illustrates the manner of lateral compliance. In this mechanism when the bar 14 is rotating as it is moved axially intermediate the pins 11, 13 one of the pins 11, 13 will strike the bar 14 before the other if there is axial misalignment of the respective axes of rotation. For example, if the pin 11 contacts the bar 14 before the bar 14 strikes the pin 13, due to angular misalignment of the respective shafts, the pin 11 must slide along the bar 14 and move in the direction of compliance in order to allow the bar to contact the pin 13 and transmit torque. It will be understood from the prior description, the pins 11, 13 are attached to a common member and cannot move relative to each other.

It will be seen that the force F on pin 11 is not in the compliant direction of the pins 11, 13. The force F has a component $f_c$, which is the force that allows the pins 11, 13 to comply with the misaligned centers or axes, however, the normal component of the force, $f_n$, manifests itself as friction in the coupling 20. This may result in the coupling locking up. To avoid this problem in the prior art apparatus it is necessary to utilize a material having a much lower coefficient of friction.

Figure 1:
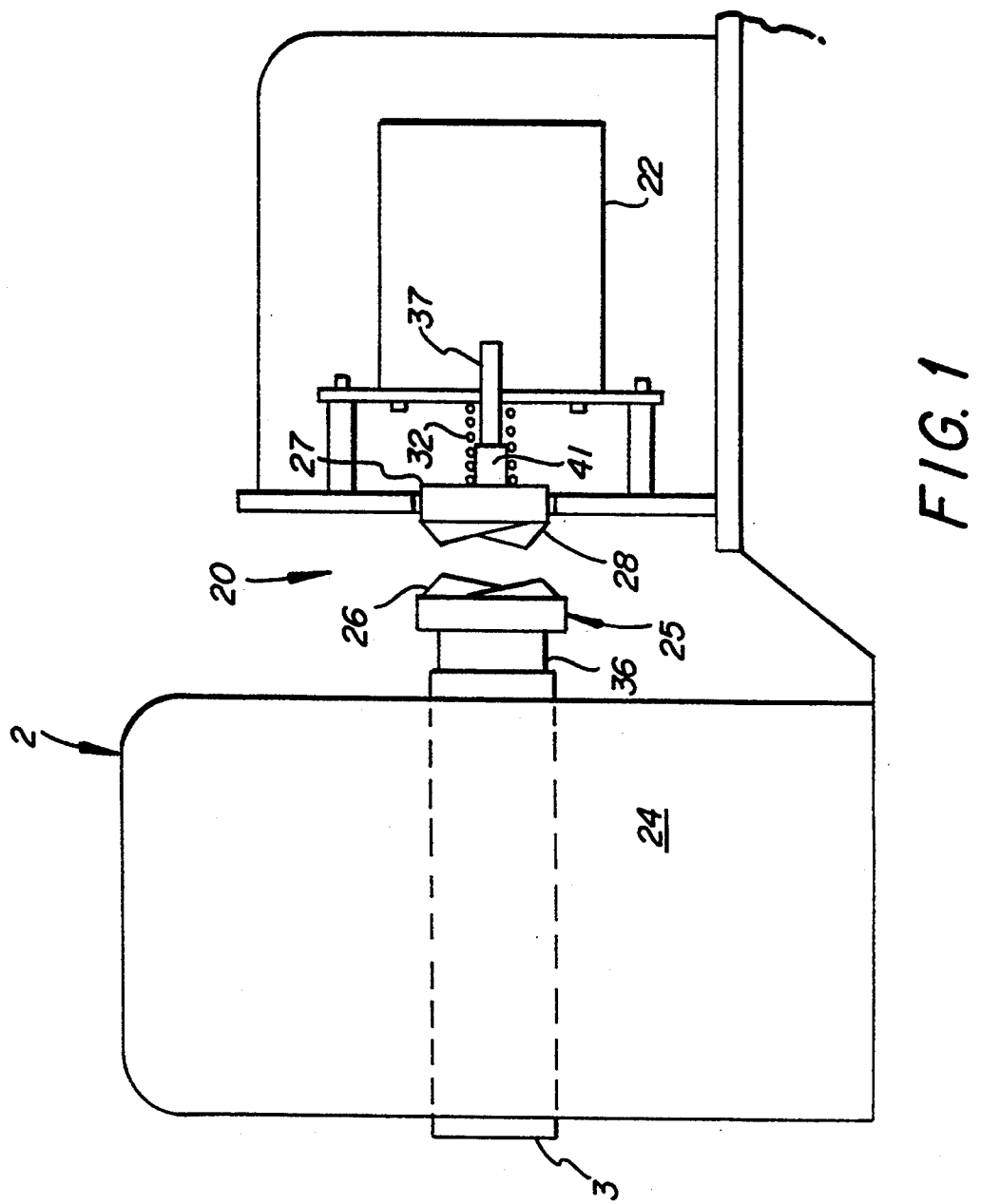
FIG. 1 is a partial front elevational view of a photofinishing apparatus having a coupling made in accordance with the present invention.
Figure 2:
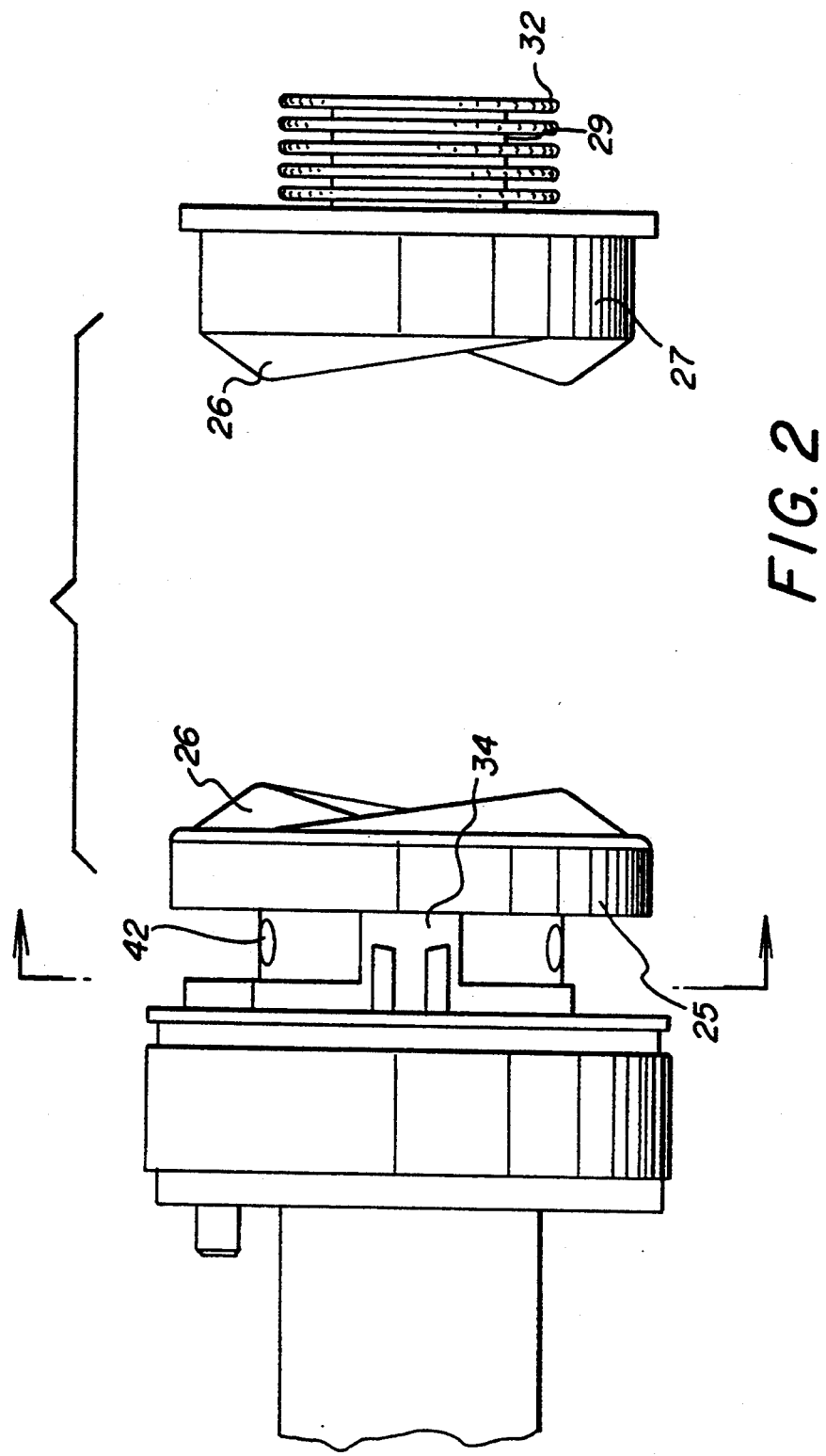
FIG. 2 is enlarged top plan of the coupling of FIG. 1.
Figure 3:
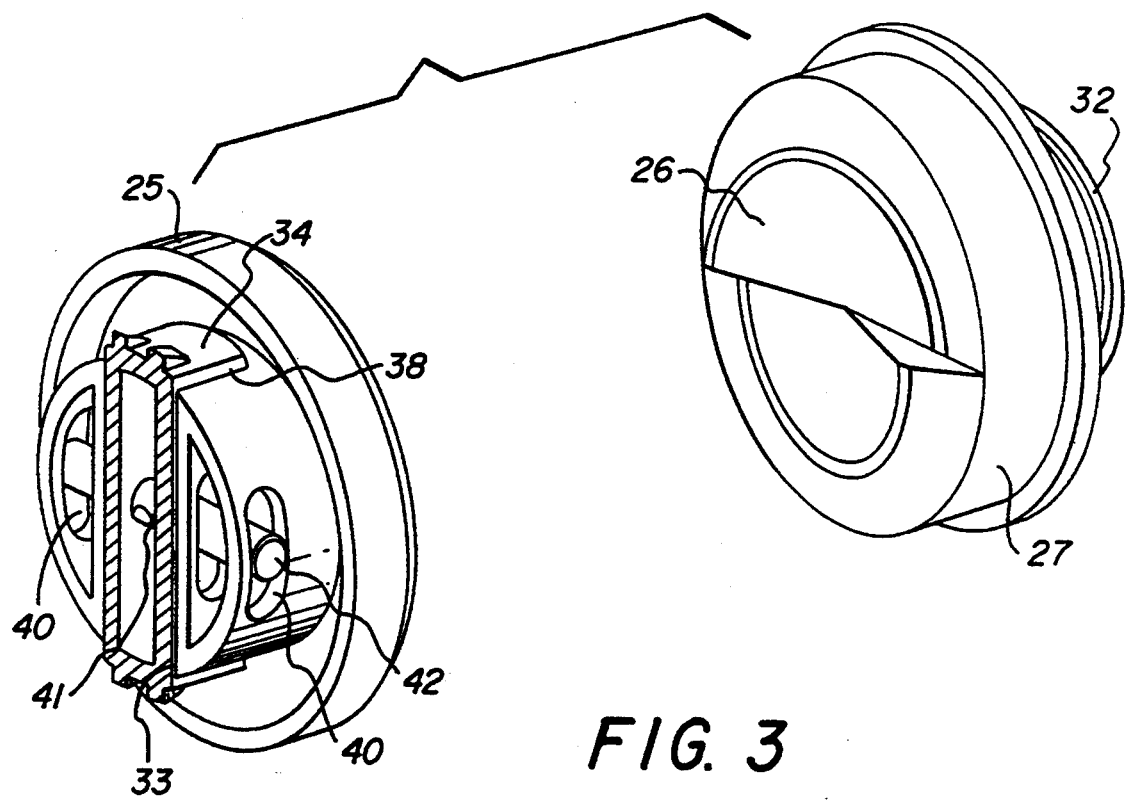
FIG. 3 is an perspective view of the coupling mechanism of FIG. 1 sectioned along line A—A.

Referring to FIG. 1 there is illustrated a portion of a photofinishing apparatus 1 having coupling 20 made in accordance with the present invention. The apparatus 1 is designed to receive in light tight engagement a magazine 2 designed to take up a web of finished photosensitive material. The magazine 2 includes a core 24 upon which the photosensitive web is wrapped. The core 24 includes a shaft 36 which forms part of a coupling 20. A drive mechanism/motor 22 is provided having a drive shaft 37 which is keyed to the hub 29 of member 27.

Referring now to FIGS. 2–3, 5–8 coupling 20 is shown in greater detail. The coupling 20 couples the take-up motor 22 to the paper take-up core 24. The coupling 20 includes first and second mating engagement members 25, 27 which ordinarily have respective identical axial faces 26, 28 that mate to transfer rotational movement. Member 25 is secured to the end of shaft 36 and the member 27 is secured to the end of shaft 37. The mating faces 26, 28 are ordinarily identically shaped although they may differ in some embodiments. Each of the faces 26, 28 includes a first arcuate inclined ramp 26a, extending through a 180 degree arc, about the periphery of the faces 26, 28 in the preferred embodiment. The ramp 26a will, in the preferred embodiment terminate in an abutment surface 30. The other 180 degree angular extent of each of respective axial faces 26, 28 comprises a second arcuate inclined ramp 26b which terminates in a second abutment surface 30. It will be seen that when the two faces 26, 28 are moved axially into engagement that the members will transmit a rotary force in one direction only. That force is transmitted when the two abutment surfaces 30, on one face 26 abut respectively with the two abutment surfaces 30 on the other face 28. In the opposite direction of rotation no rotational force is transmitted.

Although the illustrated and preferred embodiment has an inclined arcuate shaped ramp 26b extending through 180 degrees, it will be understood that in other forms of the invention the angular extent of individual inclined ramps may have a smaller angular extent. In other words, there may be a greater number of such inclined ramps disposed around the periphery of the respective faces 26, 28.

Figure 6:
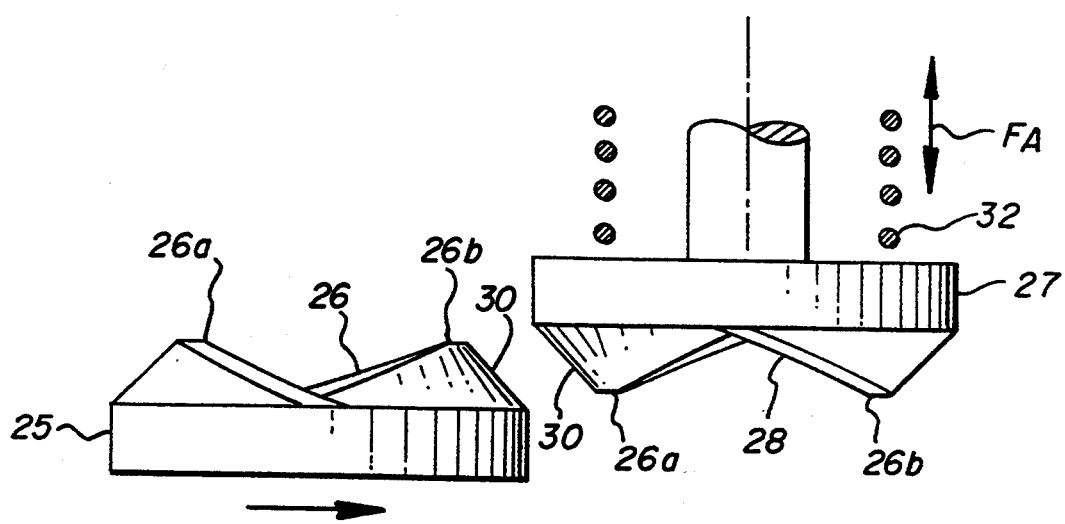
FIG. 6 is a plan view of the mating axial faces of the coupling shown in FIG. 2.
Figure 7:
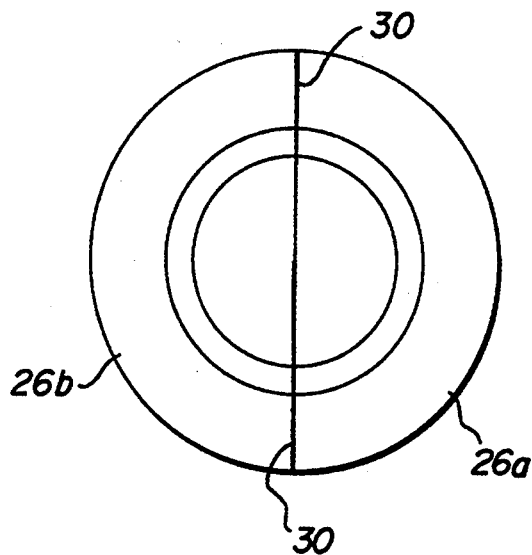
FIG. 7 is an elevational view of one of the axial faces.
Figure 8:
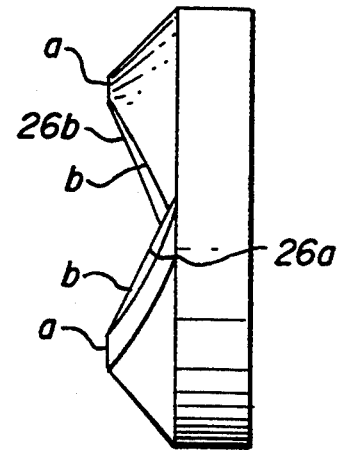
FIG. 8 is a side view of the face shown in FIG. 7.

Preferably, the faces 26, 28 are identical as indicated above. The faces 26, 28 ordinarily will be biased into engagement by a spring 32. It will be understood that the load produced by the spring 32 may be easily overcome by pushing the face or surface 26 on the member 27 away from the member 25 to allow easy disengagement and thus maintenance on the core 24. Referring particularly to FIG. 6, the force $F_A$ component needed to overcome the spring 32 for engagement or disengagement can be easily generated by sliding the member 25 across the member 27 as shown in FIG. 6. In other words, the spring 32 urges the engagement member 25 and 27 together, In one direction of rotation there is an interference or coupling to transmit torque and in the other direction there is no coupling or engagement.

In a preferred form of the invention, as best seen in FIGS. 2, 3, 5–8, the mounting of the member 25 is designed to allow lateral movement thereof. This structure to allow lateral motion is identical to the prior art previously used by the assignee of the present application. More specifically, the member 25 is provided with a slot 38 for receiving a tongue 34 formed at the end of shaft 36 which extends laterally at right angles to the axes of shaft 36. The slot 38 and tongue 34 allow lateral movement of the member 25. This lateral movement will be understood to be rectilinear movement that is inherent in the sliding, close fitting, mating engagement between the tongue 34 and the slot 38. The member 25 is further provided with a pair of elongated openings 40 disposed in walls that form slot 38. Since the respective axes of the slot 38 and tongue 34 are centered respectively on the geometric axes of respectively the engagement member 25 and the shaft 36 of the movement between the members may be characterized as radial or diametrical.

A pin 42 extending laterally through openings 40 and through a press fit opening 41 in tongue 34. The pin 42 is disposed perpendicular to the axis of the member 25 so as to prevent any axial movement of the member 25 with respect to the shaft 36. It will thus be seen that the member 25 can move laterally to allow transmission of rotational forces. In other words the present invention will accommodate some misalignment between shafts 36 and 37. This is of importance because of manufacturing tolerances in the various elements of the assembly and wear that may occur during the life time of the apparatus.

Figure 10:
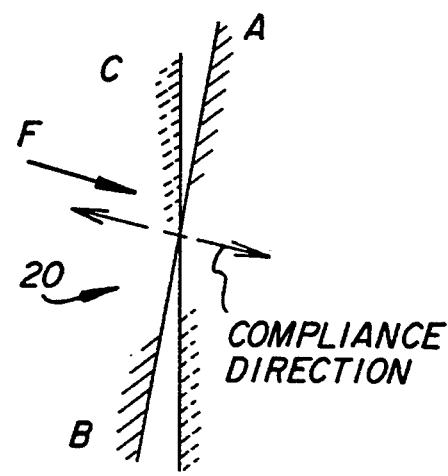
FIG. 10 is a diagrammatic view illustrating the forces in the present mechanism.

As best seen in FIG. 10 the forces in the coupling 20 eliminate or minimize the normal force component of prior art apparatus 6. More specifically, the force on the driven surface is entirely in the compliance direction and the normal component of this force is zero.

The above specification describes a new and improved ratcheting, compliant magazine drive coupling having use in a wide variety of apparatus. It will be understood by those skilled in the art that the term "compliant" refers to the ability of the apparatus to tolerate some misalignment of the respective drive and driven shafts.

It is realized that the above description may indicate to those skilled in the art additional ways in which the principals of this invention may be used without departing from the spirit. It is, therefore, intended that this invention be limited only by the scope of the appended claims.

| Parts List | |
|---|---|
| 1 | apparatus |
| 2 | magazine |
| 6 | prior art apparatus |
| 8 | drive shaft |
| 10 | head |
| 11,13 | axially extending pins |
| 14 | a bar |
| 20 | coupling |
| 22 | take-up motor mechanism |
| 24 | take-up core |
| 25 | engagement member |
| 26 | axial face |
| 26a | first arcuate inclined ramp |
| 26b | second arcuate inclined ramp |
| 27 | engagement member |
| 28 | axial face |
| 29 | hub |
| 30 | abutment surface |
| 32 | spring |
| 34 | tongue |
| 36 | shaft |
| 37 | shaft |
| 38 | slot |
| 40 | elongated opening |
| 41 | opening |
| 42 | pin |

What is claimed is:

1. A coupling assembly for coupling first and second shafts, each of said shafts having an axis of rotation, said axes being disposed in general coaxial relationship, the coupling assembly characterized by:
   a first member secured to an end of said first shaft, said first member having a first engaging surface;
   a second member secured to an end of said second shaft, said second member having a second engaging surface, said first and second engaging surfaces being disposed in generally abutting relationship; and
   biasing means for biasing said first and second engaging surfaces into making contact, said first and second engaging surfaces having a configuration which allows transmission of rotational movement from said first shaft to the second shaft in a first directional rotational movement and not allowing transmission of rotational movement from said first shaft to said second shaft in a second direction of rotational movement, said first member being secured to said first shaft by mounting means which allows movement of said first member in the direction that is substantially perpendicular to said axis of rotation of said first shaft.

2. The coupling as described in claim 1, wherein said mounting means includes a tongue-shaped member.

3. The coupling as described in claim 2, wherein said mounting means includes said first member having a slot dimensioned and configured for sliding engagement with said tongue.

4. The coupling as described in claim 3, wherein said first member further includes at least one Second slot for receiving a pin for limiting the relative axial motion between said tongue and said first slot.

5. A coupling according to claim 1 said first and second engaging surfaces have at least one arcuate ramp which extends about the axis of rotation and terminates in an abutment surface.

6. A photofinishing apparatus having a removable magazine secured thereto, said magazine forming a light tight seal with said apparatus, said magazine having a take-up core for receiving a web of photosensitive material from said apparatus, said apparatus further comprising a drive mechanism having a drive shaft and a coupling assembly for coupling said take-up core to the drive shaft, said drive shaft and said take-up core each having an axis of rotation, said axes being disposed in general coaxial relationship, the coupling assembly is characterized by:
   a first member secured to an end of said take up core, said first member having a first engaging surface;
   a second member secured to an end of said drive shaft, said second member having a second engaging surface, said first and second engaging surfaces being disposed in generally abutting relationship; and
   biasing means for biasing said first and second engaging surfaces into making contact, said first and second engaging surfaces having a configuration which allows transmission of rotational movement from said drive shaft to the take-up core in a first directional rotational movement and not allowing transmission of rotational movement from said drive shaft to said take-up core in a second direction of rotational movement, said first member being secured to said take-up core by mounting means which allows movement of said first member in the direction that is substantially perpendicular to said axis of rotation of said take-up core.

7. The apparatus as described in claim 6, wherein said mounting means includes a tongue-shaped member.

8. The apparatus as described in claim 7, wherein said mounting means includes said first member having a slot dimensioned and configured for sliding engagement with said tongue.

9. The coupling as described in claim 8, wherein said first member further includes at least one second slot for receiving a pin for limiting the relative axial motion between said tongue and said first slot.

10. A coupling according to claim 6 said first and second engaging surfaces have at least one arcuate ramp which extends about the axis of rotation and terminates in an abutment surface.

11. A photofinishing apparatus having a removable magazine secured thereto, said magazine forming a light tight seal with said apparatus, said magazine having a take-up core for receiving a web of photosensitive material from said apparatus, said apparatus further comprising a drive mechanism having a drive shaft and a coupling assembly for coupling said take-up core to the drive shaft, said drive shaft and said take-up core each having an axis of rotation, said axes being disposed in general coaxial relationship, the coupling assembly is characterized by:
- a first member secured to an end of said take up core, said first member having a first engaging surface;
- a second member secured to an end of said drive shaft, said second member having a second engaging surface, said first and second engaging surfaces being disposed in generally abutting relationship; and
- biasing means for biasing said first and second engaging surfaces into making contact, said first and second engaging surfaces having at least one arcuate ramp which extends about the axis of rotation and terminate in an abutting surface which allows transmission of rotational movement from said drive shaft to the take-up core in a first directional rotational movement and not allowing transmission of rotational movement from said drive shaft to said take-up core in a second direction of rotational movement.

12. An apparatus according to claim 11 wherein said first member is secured to said take-up core by mounting means which allows movement of said first member in the direction that is substantially perpendicular to said axis of rotation of said take-up core.

13. An apparatus according to claim 12 wherein said mounting means comprises a tongue-shaped member formed on said first shaft which engages slot formed in said first member.

14. An apparatus according to claim 13 wherein said slot is formed in a hub, a pin is provided for securing said member to said first shaft by passing through an pair of aligned slots formed in said hub and an opening provided in said tongue.

* * * * *